United States Patent [19]

Kose

[11] 4,064,921

[45] Dec. 27, 1977

[54] COILED SPRING LOCK WASHER FOR SOCKET BOLTS

[76] Inventor: Shigeru Kose, No. 8, 25-Ban, 1-chome, Furuedai, Suita, Osaka, Japan

[21] Appl. No.: 503,520

[22] Filed: Sept. 5, 1974

[30] Foreign Application Priority Data

Sept. 8, 1973 Japan .......................... 48-105440[U]

[51] Int. Cl.² ............................................. F16B 39/24
[52] U.S. Cl. ...................................................... 151/38
[58] Field of Search ............................. 151/38, 36, 37

[56] References Cited

U.S. PATENT DOCUMENTS

| | | | |
|---|---|---|---|
| 514,339 | 2/1894 | Schoaf | 151/36 |
| 1,515,346 | 11/1924 | Kreissig | 151/38 X |
| 1,847,314 | 3/1932 | Stoll | 151/36 |
| 1,876,836 | 9/1932 | Berge | 151/38 |
| 2,089,924 | 8/1937 | Legge et al. | 151/36 |
| 2,371,463 | 3/1945 | Olson | 151/37 X |

FOREIGN PATENT DOCUMENTS

| | | | |
|---|---|---|---|
| 140,643 | 5/1946 | Sweden | 151/36 |
| 212,902 | 4/1941 | Switzerland | 151/38 |

*Primary Examiner*—Ramon S. Britts
*Attorney, Agent, or Firm*—Wenderoth, Lind & Ponack

[57] ABSTRACT

A coiled spring lock washer characterized in that it is made by winding elastic wire rod spirally into two rings at the most, an upper ring of which having the outside diameter slightly larger than the inside diameter of a lower ring so that the upper ring may be forced into the lower ring to some extent when fastening a bolt, thereby preventing the bolt from loosening perfectly.

1 Claim, 8 Drawing Figures

COILED SPRING LOCK WASHER FOR SOCKET BOLTS

This invention relates to a coiled lock washer to be used for socket bolts.

In order to prevent loosening of bolts, it has been the usual practice to use washers or the like. However, with the use of conventional washers it has been impossible to prevent loosening of bolts perfectly and bolts become loose by degrees while machines are in use, with the result of unfavorable effect on the machines.

In view of the above-mentioned disadvantage, the present invention intends to prevent loosening of bolts or the like perfectly by the use of coiled spring lock washers, each of which is made by winding elastic wire rod spirally into more than one and a half rings (advantageously, more than one and a half rings and less than two rings) in the same direction as the bolt is turned and by making the outside diameter D2 of an upper ring slightly larger than the inside diameter d1 of a lower ring, so that when fastening a bolt, the upper ring may force into and expand the lower ring, which consequently presses the inner circumferential surface and the bottom of the receiving hole (socket) H.

The attached drawings show an embodiment of the coiled spring lock washer for bolts according to the present invention.

Figure 1A:
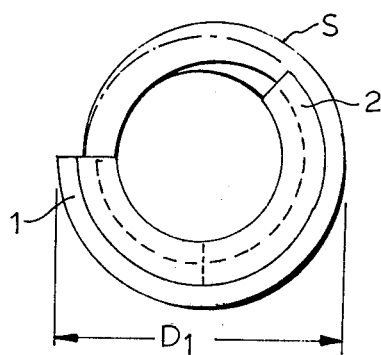

FIG. 1a is a plan view of a coiled spring lock washer and

Figure 2A:
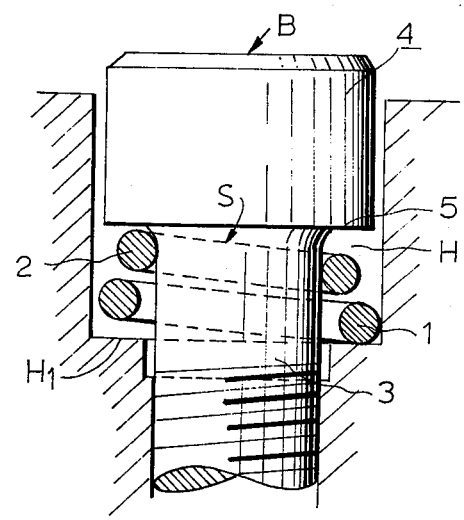
Figure 1B:
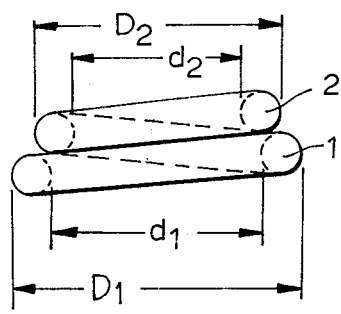
Figure 2B:
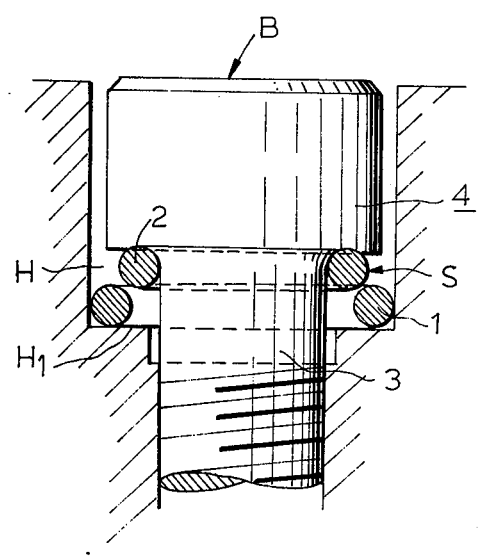
Figure 3A:
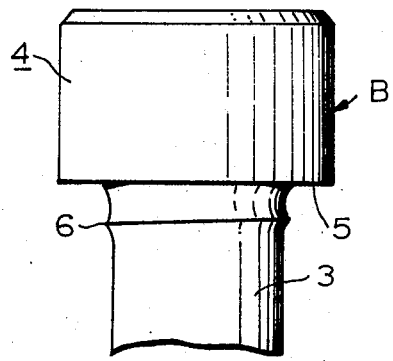
Figure 3B:
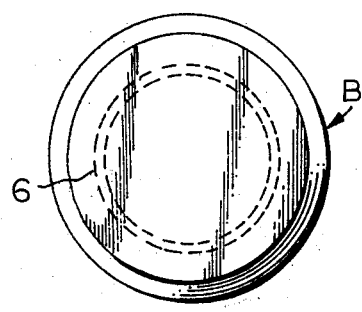

FIG. 1b is a front view of the coiled spring lock washer shown in FIG. 1a. FIG. 2a shows a cross section of the coiled spring lock washer when a bolt was partially fastened and FIG. 2b shows a cross section of the coiled spring lock washer when the bolt was fastened fully. FIG. 3a shows a front view of a socket bolt for which the coiled spring lock washer according to the present invention is used and FIG. 3b shows a plan view of the socket bolt shown in FIG. 3a.

Figure 4:
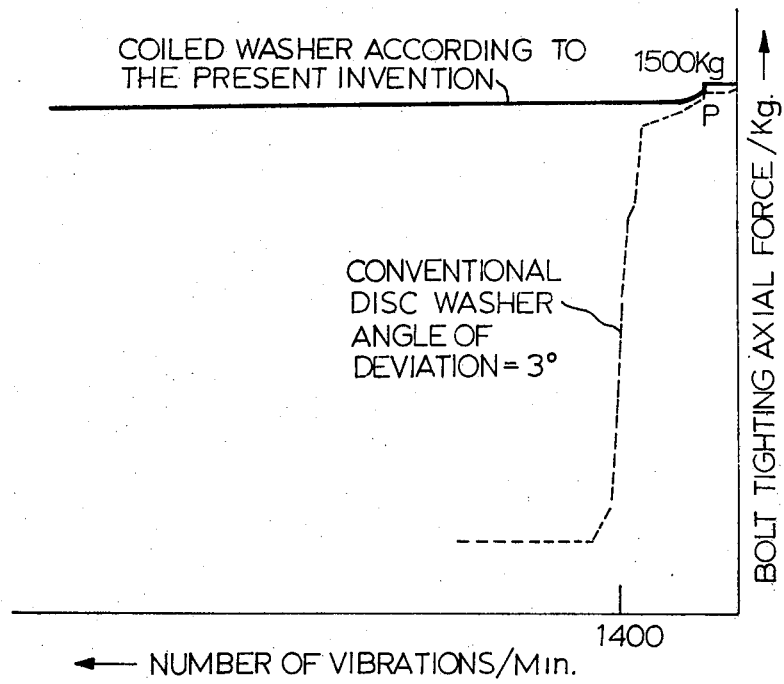

FIG. 4 is a characteristic curve of the coiled spring lock washer according to the present invention.

The nature and advantages of the present invention are described below with reference to the embodiment shown in the attached drawings.

Figure 1C:
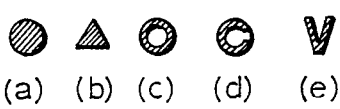

In the drawings, S is a coiled spring lock washer whose cross section may be of round shape (a), triangular shape (b), polygonal shape, ring shape (c), C-shape (d), V-shape (e) or the like as shown by FIG. 1c and is made by winding elastic wire rod spirally into more than one and a half rings (effective, if wound within the range of 1½ rings to 2 rings) in such a fashion that the outside diameter of an upper ring may be slightly larger than the inside diameter d1 of a lower ring so that, when fastening a socket bolt (hereinafter referred to as a bolt) for which the coiled spring may force into and expand the lower ring, which consequently presses the inner circumferential surface and the bottom of the receiving hole (socket) H.

Preferably, the outside diameter D1 of the lower ring 1 of the above-mentioned coiled spring lock washer S is made a little smaller than the diameter of a receiving hole H or concavity for the bolt for which the coiled spring lock washer is used. In addition, it is desirable that the outside diameter of a head 4 of a bolt B be made slightly smaller than the diameter of the receiving hole H. It is more effective to make the inside diameter d2 of the upper ring almost the same as the outside diameter of a main body 3 of the bolt so that the ring may fit on the main body with slight contact.

When using the coiled spring lock washer of the above-mentioned construction for the socket bolt B having a head to fit the receiving hole H, for example, it is set in the following way. The coiled spring lock washer is first placed in the receiving hole H and then the socket bolt B is fastened. With the advance of fastening, the lower ring 1 comes in contact with a bottom surface H1 of the receiving hole H or concavity and if the bolt is fastened still further, the washer S is pressed by both the underside 5 of the head 4 and the bottom surface H1 and consequently the upper ring 2 forces into and expands the lower ring 1 to some extent, as shown in FIG. 2b and thus the loosening of the socket bolt is prevented. If the hole diameter of the receiving hole H is made almost the same as the outside diameter of the lower ring 1 as illustrated, the periphery of the lower ring will strike upon the inner surface of the receiving hole the bolt is fastened and the lower ring will not be allowed to extend any further and, accordingly, a more secure locking effect is produced.

Instead of the above-mentioned socket bolt, if a socket bolt, as shown in FIG. 3a, having an angular protrusion around its main body 3 in parallel with or aslant the underside 5 of the head 4 is used, the coiled spring lock washer will fit easily on the bolt and firm locking will be ensured.

The foregoing is an embodiment of the coiled spring lock washer for the socket bolt which involves a deep receiving hole but the coiled spring lock washer according to the present invention is applicable to the case of the countersink or the like whose diameter is the same as the diameter D1 of the lower ring of the coiled spring lock washer.

As stated earlier, when a bolt is turned in the fastening direction, the coil end on the larger diameter side is compressed as it is prevented from extending further by the wall portion of the receiving hole H and as a result, the other coil end on the small diameter side is forced to wind around the bolt shaft and thus the bolt is locked firmly against turning in the loosening direction.

FIG. 4 shows characteristic curves obtained by testing a bolt having a hexagonal hole (size 8m.m., bolt strength 10T) for loosening, when using the coiled spring lock washer according to the present invention and a conventional disc spring washer. From these curves, it can be seen that use of the coiled spring lock washer according to the present invention involves no loosening of the bolt, except the loosening at the early stage (point P in FIG. 4) which can be attributed to a slight collapse of the underside of the bolt head. The curve shown by the dotted line is a characteristic curve obtained with the use of a conventional disc spring washer.

Coiled spring lock washers according to the present invention can be manufactured easily by a coiling machine and accordingly can be manufactured on a mass-production basis. This washer has such advantages that it can be fitted easily and ensures perfect prevention of the loosening of bolts because it fastens the bolt in conjunction with screw threads.

What I claim is:

1. A coiled spring lock washer for a socket bolt having a head portion and fitted into a member having a socket for receiving said bolt, said lock washer comprised of an elastic wire rod positioned beneath the head of the bolt in said socket and wound conically into a coil having more than one ring and less than two rings, said coil having a lower ring portion and an upper ring portion conically above the lower ring portion beneath the head of the socket bolt, the upper ring portion having an outside diameter slightly larger than the inside diameter of the lower ring portion, and the lower ring portion having an outside diameter slightly smaller than the inside diameter of the socket in which it is positioned, whereby tightening the bolt causes the upper ring portion of the rod above the lower ring portion contacting the underneath side of the head of the bolt to move downward against the inside diameter of the lower ring portion, forcing the lower ring portion to move downward into the socket and to expand the wedge against the side wall of the bottom of the socket, thus forcing the upper ring portion of the rod to wind around the bolt shaft as it is tightened, hereby locking the bolt into position in the socket.

* * * * *